(12) United States Patent
Hickey (10) Patent No.: US 6,497,350 B1
(45) Date of Patent: Dec. 24, 2002

(54) HEAVY DUTY RACK ATTACHABLE TO VARIOUS VEHICLES

(75) Inventor: David R. Hickey, Hinsdale, IL (US)

(73) Assignee: Cross Tread Industries, Inc., Willow Springs, IL (US)

( * ) Notice: Subject to any disclaimer, the term of this patent is extended or adjusted under 35 U.S.C. 154(b) by 0 days.

(21) Appl. No.: 09/560,092

(22) Filed: Apr. 28, 2000

(51) Int. Cl.$^7$ .................................................. B60R 9/00
(52) U.S. Cl. ...................................... 224/331; 224/329
(58) Field of Search .................................. 224/329, 331

(56) References Cited

U.S. PATENT DOCUMENTS

| | | | |
|---|---|---|---|
| 3,381,866 A | * 5/1968 | Wickett | 224/319 |
| 3,385,488 A | 5/1968 | Bronson | |
| 3,920,167 A | 11/1975 | Parsons | |
| 4,270,681 A | 6/1981 | Ingram | |
| 4,342,411 A | 8/1982 | Bott | |
| 4,401,247 A | 8/1983 | Zoor | |
| 4,432,480 A | * 2/1984 | Kimmel | 224/329 |
| 4,449,656 A | * 5/1984 | Wouden | 224/320 |
| 4,640,450 A | 2/1987 | Gallion et al. | |
| 4,688,706 A | 8/1987 | Thulin | |
| 4,728,019 A | * 3/1988 | Olliges | 224/329 |
| 4,752,022 A | * 6/1988 | Thulin | 224/314 |
| 4,778,092 A | 10/1988 | Grace | |
| 4,817,838 A | 4/1989 | Kamaya | |
| 4,877,169 A | 10/1989 | Grim | |
| 5,104,020 A | 4/1992 | Arvidsson et al. | |
| 5,160,075 A | 11/1992 | Moscovitch | |
| 5,257,710 A | 11/1993 | Cropley | |
| 5,303,569 A | 4/1994 | Wright | |
| 5,320,264 A | 6/1994 | Weir | |

FOREIGN PATENT DOCUMENTS

| | | |
|---|---|---|
| CH | 395764 | 12/1965 |
| CH | 558732 | 2/1975 |
| DE | 25 48 675 | 5/1977 |
| DE | 28 22 853 | 11/1979 |
| DE | 3443-377 | 5/1986 |
| DE | 3604-772 | 8/1987 |
| DE | 40 01 546 | 7/1991 |
| EP | 4041309 | 6/1992 |
| EP | 492 513 A1 | 7/1992 |

\* cited by examiner

Primary Examiner—Stephen K. Cronin
(74) Attorney, Agent, or Firm—Pyle & Piontek (57) ABSTRACT

This invention discloses a heavy duty vehicle rack capable of carrying heavy loads and that utilizes fasteners, to attach to the rack to the vehicle's gutter or drip rails. The heavy duty rack of the present invention has specially shaped cooperating end and clamp portions so that the rack can be attached to a variety of vans made by different manufacturers with different style and shapes gutter/drip rails.

29 Claims, 6 Drawing Sheets

HEAVY DUTY RACK ATTACHABLE TO VARIOUS VEHICLES

This invention relates to racks for vehicles and particularly a rack with fastening means to force an end member/clamp specially shaped to grip various shaped gutter or drip rails found on various vehicles.

BACKGROUND OF THE INVENTION

Heretofore it has been known to provide a rack for a vehicle, such as a van, truck or automobile, for carrying items above the roof of the vehicle or van. Frequently such racks comprised two spaced apart crossmembers which are mounted to the gutters or drip rails of the vehicle. As heavy items, such as ladders, lumber and pipes, are frequently carried on such a rack, it is important that the rack be solidly and strongly connected to the gutters or drip rails. Heretofore it has also been known to provide a connection on each end of each crossmember which utilized one set of fastening means arranged generally horizontally to pull the rack tight against a vertical portion of the drip rail and a second set of fastening means arranged generally vertically to pull the rack tight against a horizontal portion of the drip rail. For example, see U.S. Pat. No. 4,778,092. As there are usually two crossmembers, each with two ends, there were generally at least eight sets of fasteners which are required to be properly horizontally and vertically adjusted and tightened. An alternative was to replace the second sets of vertical fastening means with some sort of pivoting connection, such as formed by a pivoting extension which engages in a formed pivot opening. The provision of such pivoting connection can be more expensive to make as forming dies may be needed to make the pivoting extension and/or pivot opening. Further the pivot type connection can be even more difficult to tighten securely because of "play" and looseness of the pivot connection making the pivot connection less secure to use than the first described sets of horizontal and vertical fastening means, particularly where a rack is to carry heavy items, such as is likely to be used by a tradesman on his/her service van.

A strong prior art rack for such purpose is disclosed in my U.S. Pat. No. 5,746,362, which is hereby incorporated by reference. The rack described in my U.S. Pat. No. 5,746,362 comprises two or more crossmembers which are secured at each end thereof by a clamp member held to the end member of the crossmember by a single set of generally horizontal fastening means, with no separate vertical fastening means or pivot connecting means being utilized. A tight connection in both the horizontal and vertical is provided by the single set of generally horizontal fastening means because of this rack's unique design. The crossmember's ends and clamps are arranged to be clamped together horizontally by this fastening means, and each has inclined engaging portions to cause the clamp to engage the gutter or drip rail and pull it tight both vertically and horizontally against the crossmember end member.

While strong racks and strong fastening means are generally known, such as shown in my U.S. Pat. No. 5,746,362 patent, heretofore it has been necessary to provide custom end members and clamps to fit a plurality of different make vehicles. The result was that the manufacturers had to make and retail outlets had to carry many models to fit the various make vans and vehicles with their different type roof drip and gutter rails constructions.

SUMMARY OF THE INVENTION

The present improved heavy duty rack invention is particularly suitable for fitting various models of trucks and vans with their various shaped drip or gutter rails. Even though the improved rack of the present invention can fit more than one make or model of van or vehicle, it still is capable of safely carrying very heavy loads, including ladders, lumber, pipes, etc. with a total load weight of up to 1,200 pounds evenly distributed. In fact the rack of the present invention, is capable of lifting the rear of a typical van in the air if a crane is attached to the rack and raised.

The heavy duty rack of the present invention for securing such heavy items and carried on the drip rail or gutter of a van or truck, comprises a square or rectangular cross section tubing cross member adapted to extend horizontally across the full width of a van or truck type vehicle roof generally from to or beyond one drip rail to or beyond the drip rail on the opposite side of the van type vehicle roof. The cross member has opposing ends or members defining a length therebetween and is made of steel and/or aluminum having a minimum wall thickness of ⅛ to ¼ inch thick with about 3/16 of an inch being preferred. A pair of the unitary one piece end members are secured by welding at each end of said cross member. Each of said end members are bent from flat, compatible material of at least ⅛ to ¼ inch thick, with 3/16 of an inch thickness being preferred, of steel or aluminum. Each of the unitary one piece end members extend generally downwardly from the respective end of its said cross member towards its underneath, associated drip rail. Each unitary one end member is bent and its lower portion or particularly lower end is adapted to rest on various types of van or vehicle drip rails. Clamping means are provided for each unitary, one piece end member shorter in height than the unitary, one piece end member. Each clamping means is bent from flat material of ⅛ to ¼ inch thick, with about 3/16 of an inch thickness being preferred, and made of steel or aluminum. The lower portions or ends of the clamping means are also specially shaped to cooperate with its end member and secure the rack to various shaped drip or gutter rails found on various make vans or vehicles. Each end member and its associated clamp are adapted to sandwich various portions of the adjacent various shaped van type vehicle drip rails. The clamping means and fastening means, in this instance with one generally extending parallel and the other extending perpendicular to said cross member, pulls the clamping means towards the unitary one piece end member to tightly sandwich the drip rail to hold the heavy duty rack to the van or other type vehicle's drip rail. The rack of the present invention is especially configured to be attachable to various make truck and van drip molds and gutter rails, such as those found on Ford, Dodge, Chevrolet, GMC and Chrysler.

In order to accommodate these various drip racks or gutters, the attaching portions of the rack of the present invention is especially formed. Unlike the rack shown in the U.S. Pat. No. 5,746,632 patent which had simple "L" shaped drip rail or gutter engaging portions, the drip rack or gutter engaging portions of the clamp and end member of the rack of the present invention are a series of successive steps, a double step or "W" which can accommodate both the simple "L" shaped gutter or drip rail, and the more complicated wing, successive stepped, or "W" shaped profiles found on some vans or trucks, such as those sold under the "GMC" and "Chevrolet" brands. Thus, with the present invention one style rack can be made to fit several brands of vans and their drip rail and gutter styles.

Further, unlike some prior art two bolt (vertical and horizontal) attached racks which have their end pieces at angles to the gutter or drip rail and which tends to increase the outboard or spreading load on the gutter, and thus reduce the carrying capacity, in the present invention the end pieces are located generally vertically so that the load transferred to or imposed on the gutter or drip rail is also generally vertical and can, thus, be safely maximized. Applying the load to the gutter or drip rail vertically permits a greater load to be safely imposed on the gutter or drip rail, and thus the van or vehicle to carry a greater load. Further, rather than have separate end pieces, which permit adjustment for width but could limit load carrying capacity, in the present invention the end members or pieces are solidly welded to the ends of the cross bar or member, and the cross bar itself is made of two heavily constructed pieces which telescope over a length of a few feet, and are welded to the end members to permit a pair of crossbars to safely carry a maximized load, as heavy as 1,200 pounds, evenly distributed.

OBJECTS OF THE PRESENT INVENTION

It is an object of the present invention to provide a heavy duty vehicle rack for carrying heavy loads, such as ladders, pipe, lumber, etc., weighing up to 1,200 pounds evenly distributed, suitable for use by trades persons.

It is another object of the present invention to provide a heavy duty rack which can be easily but strongly attached to a variety of vehicles.

Yet another object of the present invention is to provide a heavy duty rack which attaches tightly to a variety of shaped drip rails of various vehicles using portions to fit tightly onto various portions of the various shaped drip rails.

These and other objects of the present invention will become apparent from the accompanying drawings and following written description.

DESCRIPTION OF THE DRAWINGS

FIGS. 10A and B are cross-sectional views similar to FIGS. 7–9, but showing how the present invention can be utilized with the heavy duty rack of the construction shown in my prior U.S. Pat. No. 5,746,362 and fitted to two different style drip rails.

DESCRIPTION OF THE PREFERRED EMBODIMENT

Figure 1:
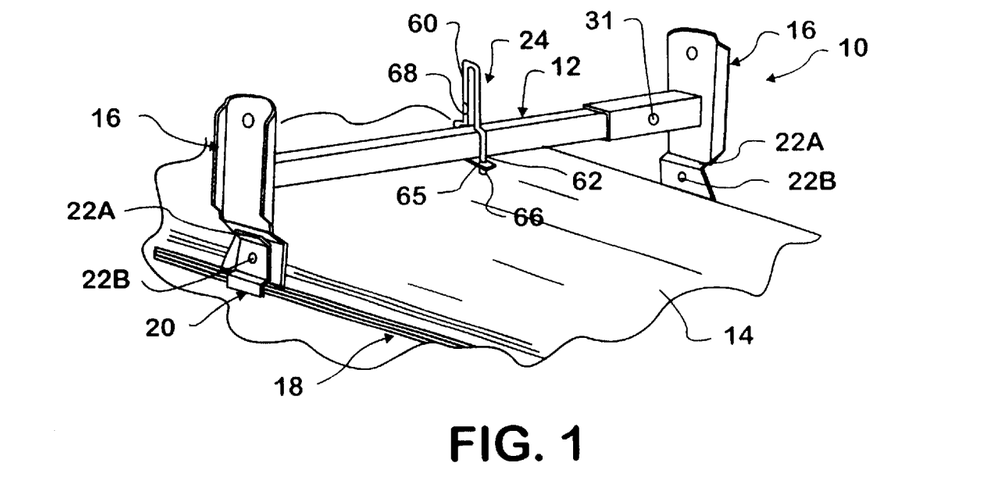
FIG. 1 is a perspective view of the heavy duty rack of the present invention shown mounted to one style drip rails or gutters of one type vehicles, such as a van.

Referring to FIG. 1, the vehicle rack 10 of the present invention is shown. The rack 10 includes, at least one and preferably two crossmembers or bars 12 which are held above the vehicle roof 14, each by its own two end member 16. Each end member 16 rests upon the vehicle's gutter or drip rail 18 and is tightly held there by a clamp 20. As is noted below, the end members and clamps are specially shaped to fit a variety of shapes of drip rails found on various vehicles. The clamp 20 also engages the drip rail and is held to the end member 16 generally by fastening means 22. In this instance fastening means 22 consists of a set of two bolts and nuts, one set extending generally vertically (22a) and the other extending generally horizontally (22B). Of course the fastening means 22 could be in other forms, such like that shown in my prior U.S. Pat. No. 5,746,362. If desired, an additional intermediate mount 24 can be provided for the crossmember 12. Now that the overall construction of the vehicle rack of the present invention has been generally described, the details thereof will be discussed below.

Figure 2:
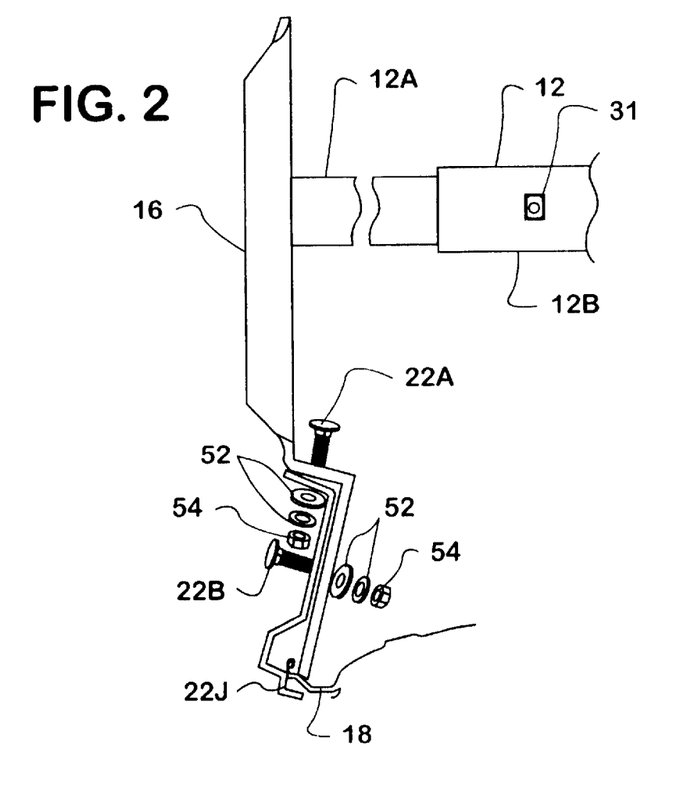
FIG. 2 is an enlarged exploded view of one end of the heavy duty rack of the present invention shown in FIG. 2, but shown in an unassembled state.

Referring to the crossmember 12, it preferably is made of rectangular, possibly square, cross section steel or aluminum tubing of outside cross sectional dimensions of 4 inches by 4 inches with ½ inch thick wall to 1 inch by 1 inch with ⅛ inch thick wall, with about 1-½ inch by 2 inch with 3/16 inch thick wall being preferred. Tubing on or about 1-¾ inches× 1-¾×3/16 inch thick or 14 gauge is suitable. Of course, other size or shape tubing could also be used. Preferably the crossmember 12 is made in two parts, an inner part 12A and a tubular outer part 12B which telescopes together to provide an exact fit for the width of various vehicles. The crossmember's 12 outer part 12A is secured, as by welding to one of the end members 16, in this instance the right one shown in FIG. 1. The other end member 16, the left one in FIG. 1, is secured, as by welding to the inner part 12B of the crossmember 12, a stub member, which is of a similar cross section as the outer part of the crossmember 12A, but of a smaller size so as to telescope inside of the outer part of the crossmember 12A. The crossmember 12 and its two parts (12A and 12B) can then be provided in a kit form of a sufficient length, compared to the width of the vehicle roof 14, desirably to provide a significant overlap of 12A and 12B (say at least one foot) and then, if need be, cut to a length to exactly fit the vehicle's roof width. The stub 12B and outer portion 12A of crossmember 12 can then be drilled at a point where they overlap and then secured together with a fastener such as a bolt 31 (FIGS. 1 and 2) and nut, preferably of the self-locking Nylock type. Thus, a single kit for the roof rack and crossmember of the present invention can be easily custom fitted to a variety of width vehicles. Optionally the crossmember could be a single piece of a width to fit across the vehicle and having the end members secured to its respective ends.

Figure 3:
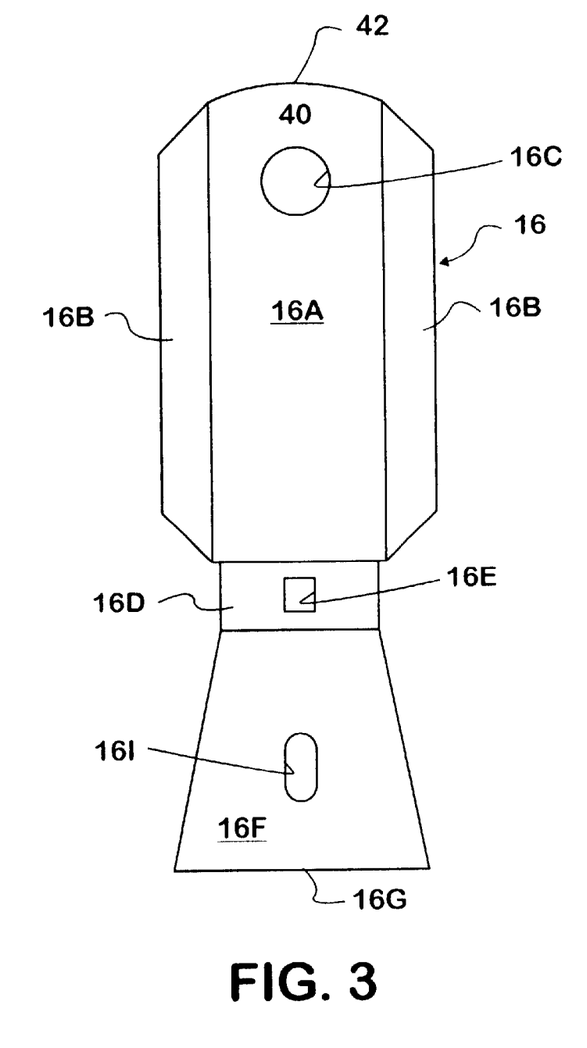
FIG. 3 is an elevational view of the crossmember end blank shown in FIGS. 1 and 2, before being bent to shape.

Each of the two end members 16 is similar to the other, and in essence a mirror image of, in this instance, and identical to one another. The end members 16 are formed from a flat blank 16' shown in FIG. 3 and has an upper portion 16A with two vertical side wing 16B. It also includes a tie-down opening 16C. The blank's upper portion 16A is unitary with an intermediate portion 16D, which includes a stamped hole 16E, which receives the square portion of a carriage bolt. The intermediate portion 16D is unitary with a lower portion 16F which is trapezoidal in shape having a larger bottom edge 16G to better spread out the imposed load to be carried by the rack onto a length of the drip rail.

Figure 4:
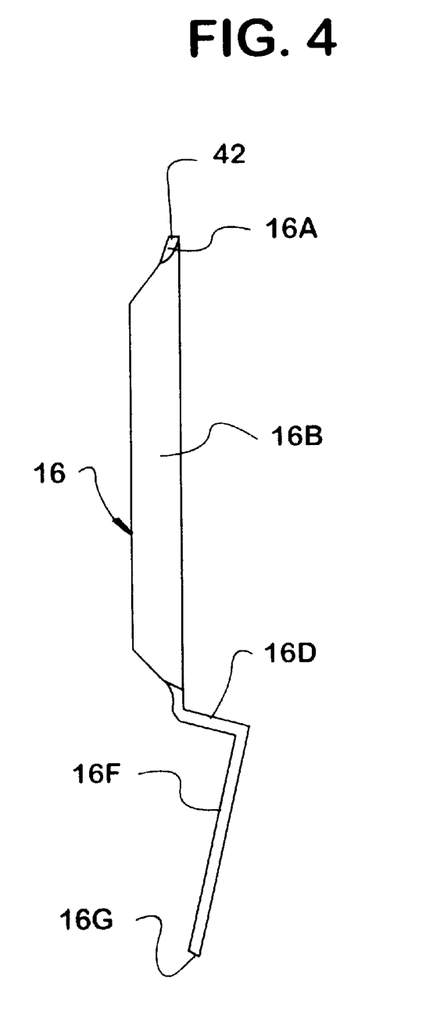
FIG. 4 is a side elevational view of the blank shown in FIG. 3, but after being bent to shape as shown in FIGS. 1 and 2.

The lower portion 16H has a slot 16I for the other carriage bolt 22B. As is shown in FIG. 4, the blank 16' is transformed into the end 16 as follows: The side wings 16B are bent, here 90°, to the main portion to stiffen the section. Also as shown in FIG. 4, the intermediate portion 16D is bent, here about 75°, to the upper portion 16A, to better transfer the load more perpendicularly onto the drip rail, and the lower portion 16F is bent, here 90°, to the intermediate portion 16D. The lower portion 16F of the end member 16 is generally angled somewhat off of vertical and has the bottom edge 16G for engaging the horizontal portion 38 of the various "L", successive stepped, "W" or other shaped drip rail or gutter 18 on the vehicle roof 14. The upper portion 40 of the end member 16 is also vertical and terminates in an attractive curve 42. This upper portion 40 forms a cargo stop to keep whatever is placed on the crossmember 12 from shifting and/or falling off. If desired, the opening 16C in the end 16 can be used to assist securing a tie down rope or device. As was heretofore mentioned, the crossmember 12 or its associated stub 12A is secured to one or the other end members 16.

Figure 5:
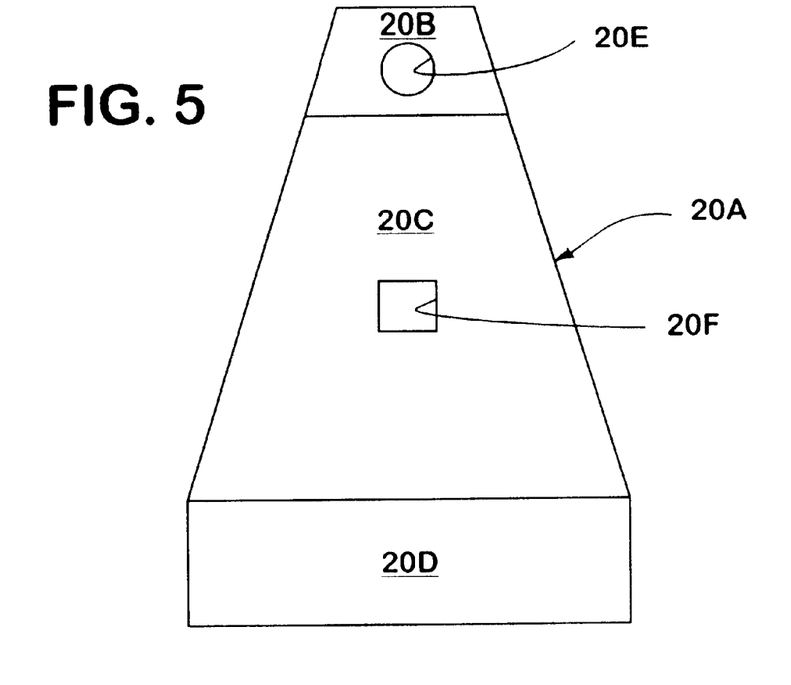
FIG. 5 is an elevational view of the clamp blank shown in FIGS. 1 and 2, before being bent to shape.
Figure 6:
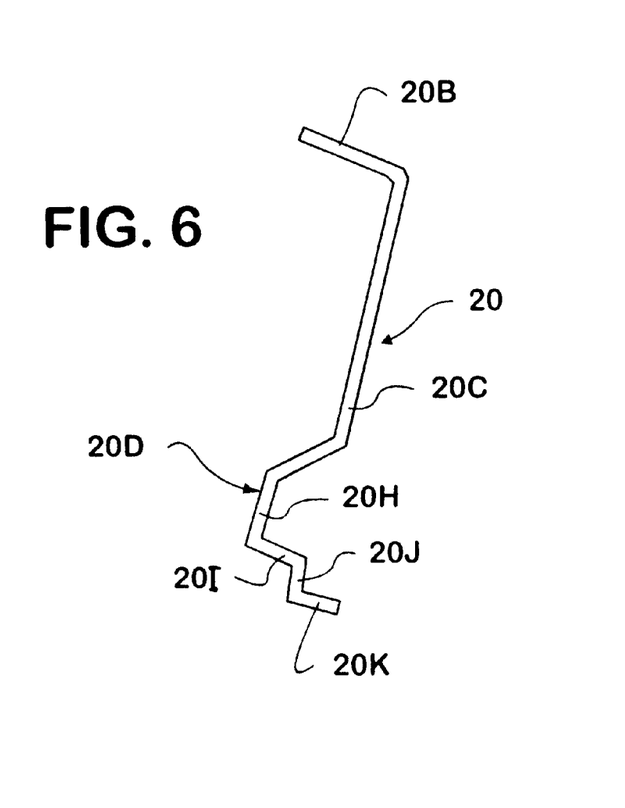
FIG. 6 is a side elevational view of the clamp blank shown in FIG. 6, but after being bent to shape as shown in FIGS. 1 and 2.
Figure 7:
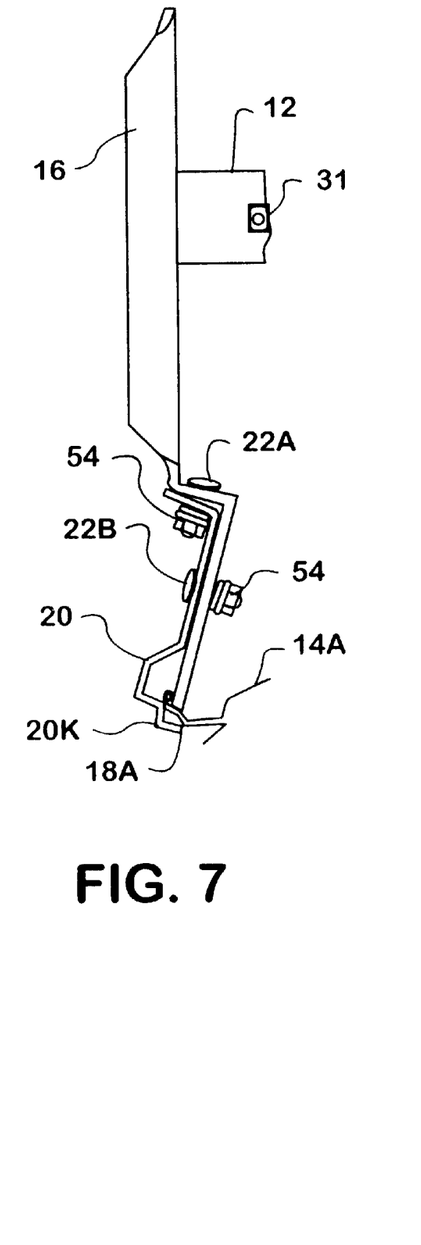
FIG. 7 is a cross-sectional view of the left end of the heavy duty rack shown in FIG. 1, showing how the heavy duty rack is assembled and secured to a vehicle having a left side drip rail of one style.
Figure 8:
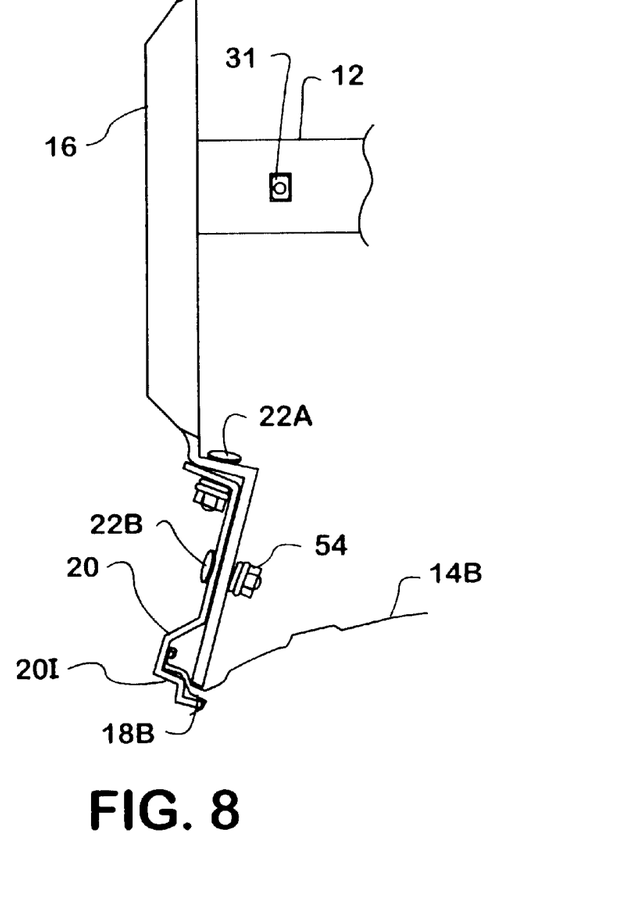
FIG. 8 is a cross-sectional view, similar to FIG. 7, but showing how the heavy duty rack of the present invention can be fitted to another style drip rail on another type/brand vehicle.
Figure 9:
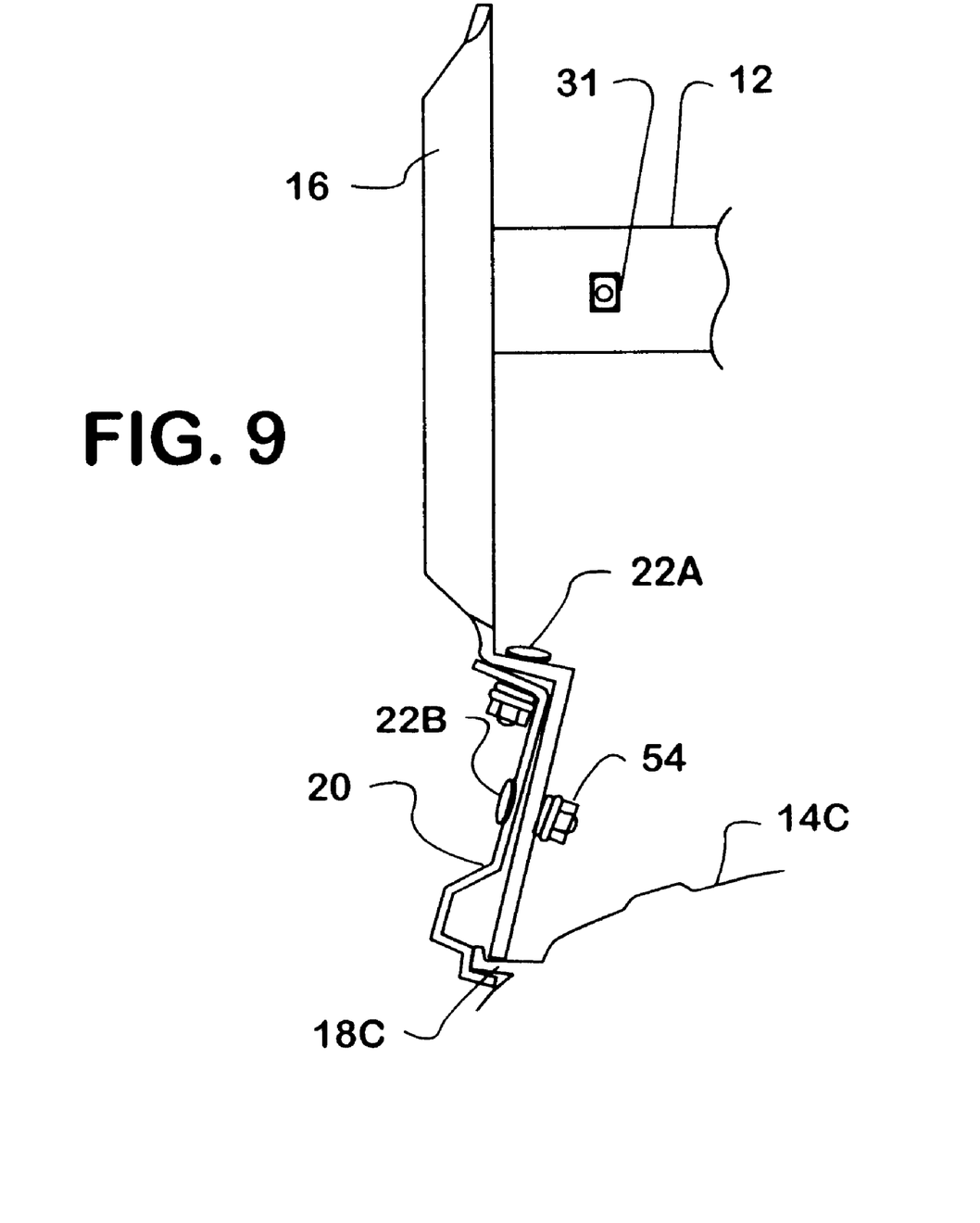
FIG. 9 is a cross-sectional view similar to FIGS. 7 and 8, but showing how the heavy duty rack of the present invention can be fitted to yet another style drip rail on yet another type/brand vehicle.

As mentioned, to hold the end member 16 in place on the drip rails 18, the clamp 20 is provided. As shown in FIGS. 5 and 6, the clamp 20 is also formed of steel or aluminum of a thickness similar to that of the end members 16. A shown in FIG. 5, the flat blank 20A is somewhat triangular in shape having a small trapezoidal portion 20B on top of a large intermediate trapezoidal portion 20C, which is integral with 20B. Also integral with 20C, is a lower rectangular portion 20D. As shown, an opening 20E in the upper portion 20B is formed for the vertical fastener while a square hole 20F is formed for the carriage bolt of the horizontal fastener. The flat clamp blank 20A is bent into the somewhat complicated shape shown in FIG. 6 to form the clamp 20, as follows: The portion 20B is generally bent at an angle, here about 90°, to the intermediate portion 20C. The intermediate portion 20C, itself is bent below its mid point at about 45°, while the lower portion 20D is bent into several steps adjacent so as to generally have a several step or "W" shape, having portions 20H, 20I, 20J and 20K. The clamp 20 has a lower end which is formed in a "W" and this "W", in turn, at its lower portion includes an "L" shape having a generally vertical part 20J and a generally horizontal part 20K. Generally, the cooperating pieces 16 and 20 provide the desired clamping or tightening action between them when they are pulled together by fastening means 22 about a sandwiched drip rail. Generally washers 52 could be provided or eliminated and/or made in the form of a lock washer. Preferably, the nuts 54 are of the self-locking type with a nylon or the like insert so that no lock washer is needed. Preferably to prevent rotation of the bolts, they are of carriage bolt construction having a square shank just below the bolt head which engages a provided square opening to accommodate the carriage bolts and prevent their rotation. See FIG. 7.

As shown in FIG. 1, the intermediate member 24 is formed from a unitary bent rod member 60 which at its upper ends fits about the crossmember 12 and has its lower opposed two ends 62 threaded. The lower legs of the rod members 60 are secured to the crossmember 12 with a cross bar 65 and self-locking nuts 66. The opening 68 formed between the rod 60 can be provided and used to tie a line or rope or to hold a ladder, lumber and/or a pipe in place.

The manner in which the clamp 20 secures the end member 16 and its attached crossmember's 12 inner and outer parts to the various shaped drip rails 18A, 18B and 18C of the vehicle roofs 14A, 14B and 14C is shown in FIGS. 7, 8, 9 and 10. As is shown, the fastening means 22A and B forces the clamp 20 tight against the end member 16. At the same time the lower end (be it one or more of 20H, 20I, 20J and/or 20K) of the clamp 20 is forced upwardly to sandwich the drip rail against the bottom 16G of the end member 16. Thus, no matter what the drip rail shape, be it "L" shaped, "W" shaped, stepped, winged, or some other shape, it can be tightly gripped both vertically and horizontally by the ends 16 and clamps 20 when fastening means 22 (A and B) are secured.

Figures 10A, 10B:
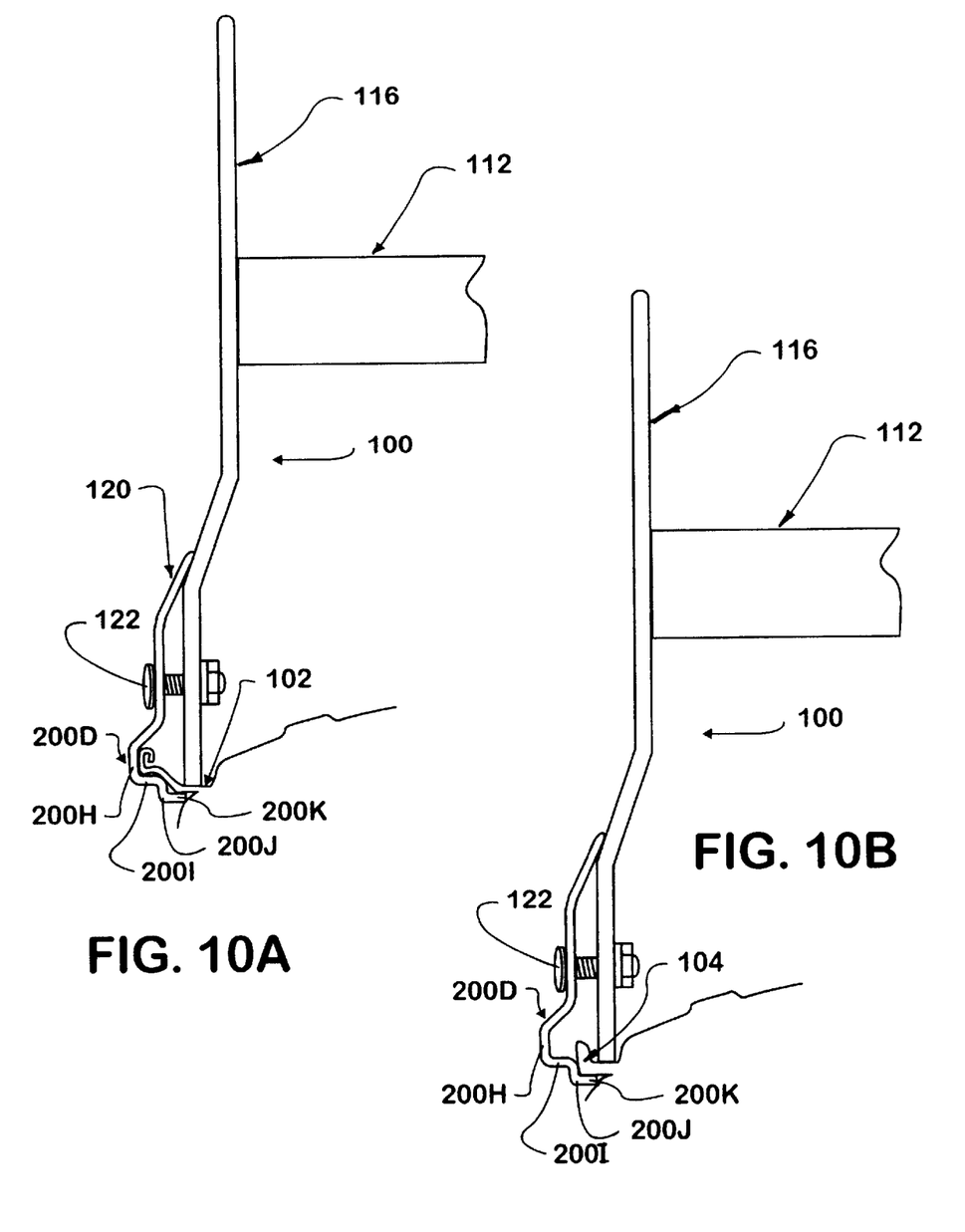

The construction of the present invention of course could be adapted to other racks to permit them to be attached to the various shaped gutters or drip rails, such as shown in my prior U.S. Pat. No. 5,246,362 (indicated by the numeral 100) or U.S. Pat. No. 4,778,092 as is particularly shown in FIGS. 10A and B wherein two different drip rails styles (indicated by the numerals 102 and 104) as shown. In this instance, those portions that are like the U.S. Pat. No. 5,246,362 patent are given reference numbers 100 higher. For example, what was 20 in the U.S. Pat. No. 5,246,362 application is shown as 120 in FIGS. 10A and B. The new portions of the present invention are given reference numbers 200 higher than those portions shown in FIGS. 1–9. It should be understood the rack 100 shown in FIGS. 10A and B are identical, but positioned differently to rails 102 and 104.

While specific angles are shown for shaping the blanks for the end member and clamps, other angles could be used. For example, angles ±15° of the angles set forth could also be used.

While a specific fastening means is shown, other type fastening means could be used, and other means of securing the clamp to the end member could also be used. While the special shaped portion was shown on the clamp, it could instead have been provided in the end member.

While the preferred embodiment of heavy duty racks of the present invention for use on a vehicle has been illustrated and described, and some of the possible alternatives set forth, from the foregoing it should be understood that other variations, modifications which are equivalent structures are possible, and thereof fall within the scope of the appended claims.

What is claimed is:

1. A heavy duty vehicle rack for securing to the various shaped drip rails on various type vehicles, comprising a crossmember adapted to extend horizontally across the vehicle roof generally from one drip rail to the drip rail on the opposite side of the vehicle roof, end members on at each end of said crossmember, said end members extending generally downwardly from at least said crossmember towards said drip rails, said end member at its lower end adapted to engage said drip rail, clamping means for each end member for securing said rack, one of said end members and said clamping means having a "W" shaped lower end, said "W" shaped lower end being adapted to engage with various shaped drip rails on various type vehicles, said clamping means and said end member being adapted to sandwich said drip rail, and fastening means for pulling said clamp means against said end member to tightly sandwich the drip rail to hold the rack to the drip rail, said "W" shaped lower end being entirely located below said fastening means, whereby tightening said fastening means pulls said clamp means tight against said end member and simultaneously causes said clamp means to pull at least one portion of said "W" shaped end on one of said end members and clamp means to tightly hold the rack to the various shaped drip rail.

2. In the rack of claim 1, wherein said "W" shaped lower end is provided in said end member.

3. In the rack of claim 1, wherein said fastening means comprises at least a self-locking fastener.

4. In a rack as in claim 1, further comprising an intermediate stop, said intermediate stop being adjustable along the length of said crossmember and secured to said crossmember.

5. In a rack as in claim 1, wherein said intermediate stop is formed from rod and bent to shape, said rod having two lower ends secured about said crossmember.

6. A rack as in claim 1, wherein said end member and said clamp means are adapted to grip "L" shaped and "W" shaped drip rails.

7. A rack as in claim 1 capable of carrying up to 1200 lbs.

8. A rack as in claim 1, wherein said "W" shape has four portions, with two of said portions engaging an "L" shaped drip rail, and at least one of said other than said two portions for engaging a "W" shaped drip rail.

9. In the rack of claim 1, wherein said crossmember is in two parts, with each part of said crossmember being fastened to one of said end members, said two parts being secured together, whereby one of said parts of said crossmember may be cut to fit the width of the vehicle and then the two parts secured together.

10. In a rack as in claim 9, wherein one of said crossmember parts telescopes within the other of said crossmember parts.

11. A rack as in claim 1, wherein said clamp means is "W" shaped.

12. A rack as in claim 11, wherein said end member rests on the drip rail.

13. A rack as in claim 1 capable of being used to lift the vehicle.

14. A rack as in claim 13 capable of carrying up to 1200 lbs.

15. In the rack of claim 1, wherein said "W" shaped lower end is provided on said clamping means.

16. In a rack as in claim 15, wherein said clamp means and its "W" shaped end along with said end member is adapted to engage and secured to a "L" shaped drip rail.

17. In a rack as in claim 15, wherein said clamp means and its "W" shaped end along with its end member is adapted to engage with and secure to a "W" shaped drip rail.

18. In the rack of claim 15, wherein said clamp means has a portion formed as a "W" with a lower portion of the "W" forming generally an "L", said fastening means comprising at least one generally horizontal self-locking nut and bolt, and at least one generally vertical self-locking nut and bolt and said end member and said clamp means having openings to receive said bolts, said crossmember being in two parts, with each part of said crossmember being fastened to one of said end members, one of said crossmember parts being the inner part and the other of said crossmember parts being the outer part, said inner part being telescoped within the outer crossmember part, fastening means for said crossmember for securing said two crossmember parts together, whereby one of said parts of said crossmember may be cut to fit the width of the vehicle and then the two crossmember parts secured together.

19. In a rack as in claim 18, said outer part of said crossmember being of a length substantially that of the distance to span the width of said vehicle, said inner part of said crossmember being of a length sufficient to fasten said outer and inner crossmember parts together, further comprising an adjustable intermediate stop securable in any position along the length of said outer part of said crossmember, additional fastening means for securing said intermediate stop in position on said outer part of said crossmember.

20. A heavy duty vehicle rack for a vehicle having a drip rail on each side of the vehicle, comprising a crossmember adapted to extend across a vehicle, two end members, said end members being bent from a flat blank, said end members being secured to the ends of said crossmember, said ends of said crossmember and said end members on the end of said crossmember being aligned generally vertically above the drip rail of the vehicle, clamp means for securing the rack to the drip rail, said clamp means being formed from a flat blank to have a shaped lower end with at least two different portions adapted to engage with various shaped drip rails on various type vehicles, said clamp means tightly pulling at least one of said at least two different portions of the shaped lower end of said clamp means and end members relatively toward each other while sandwiched around its adjacent drip rail to hold said rack to said vehicle.

21. A rack as in claim 20 capable of being used to lift the vehicle.

22. A rack as in claim 20 capable of carrying up to 1200 lbs.

23. A rack as in claim 22 capable of being used to lift the vehicle.

24. In a rack as in claim 20 wherein at least one of said shaped lower end of clamp means and end member on one side of the vehicle is "W" shaped, said "W" shape being adapted to engage with and secure to various shaped drip rails on various type vehicles.

25. In a rack as in claim 24, wherein the other of said clamp means and end member is "L" shaped.

26. In a rack as in claim 25, wherein said clamp means is "W" shaped and said end member is "L" shaped.

27. In a rack as in claim 20, wherein said clamp means further includes fastening means that are self-locking.

28. In a rack as in claim 27, wherein said crossmember comprises one portion fastened to one end member and another portion fastened to the other end member, said one and another portions of said crossmember telescopically engaging each other.

29. In a rack as in claim 27, further comprising a rod bent to form an intermediate member.

* * * * *